D. BELDEN.
THERMOSTAT.
APPLICATION FILED MAR. 28, 1914.
1,154,361.
Patented Sept. 21, 1915.
3 SHEETS—SHEET 3.
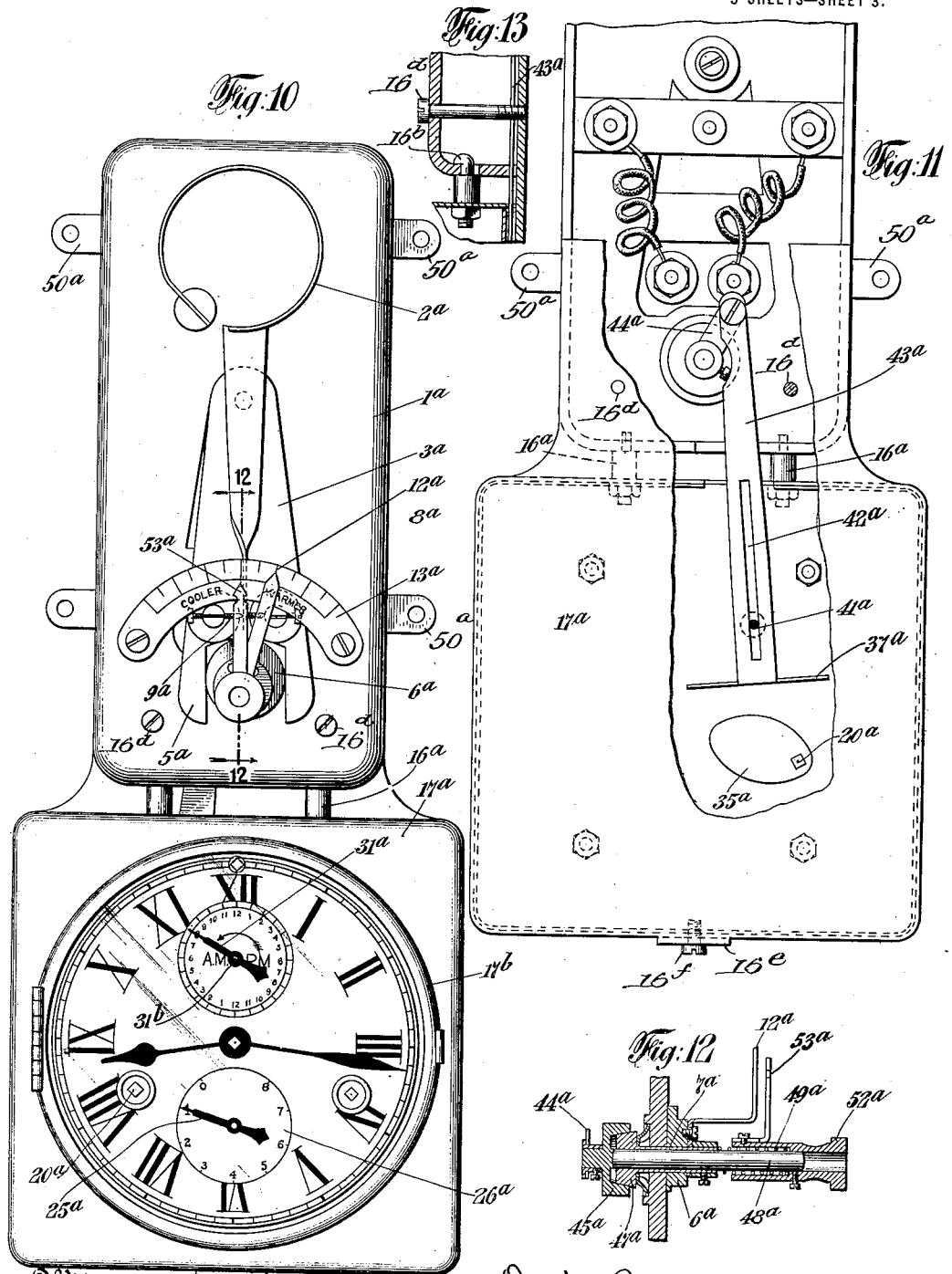
Witnesses:
John E. Rager
A. Worden Gibbs
David Belden  Inventor
By his Attorneys
Whitaker & Prevost

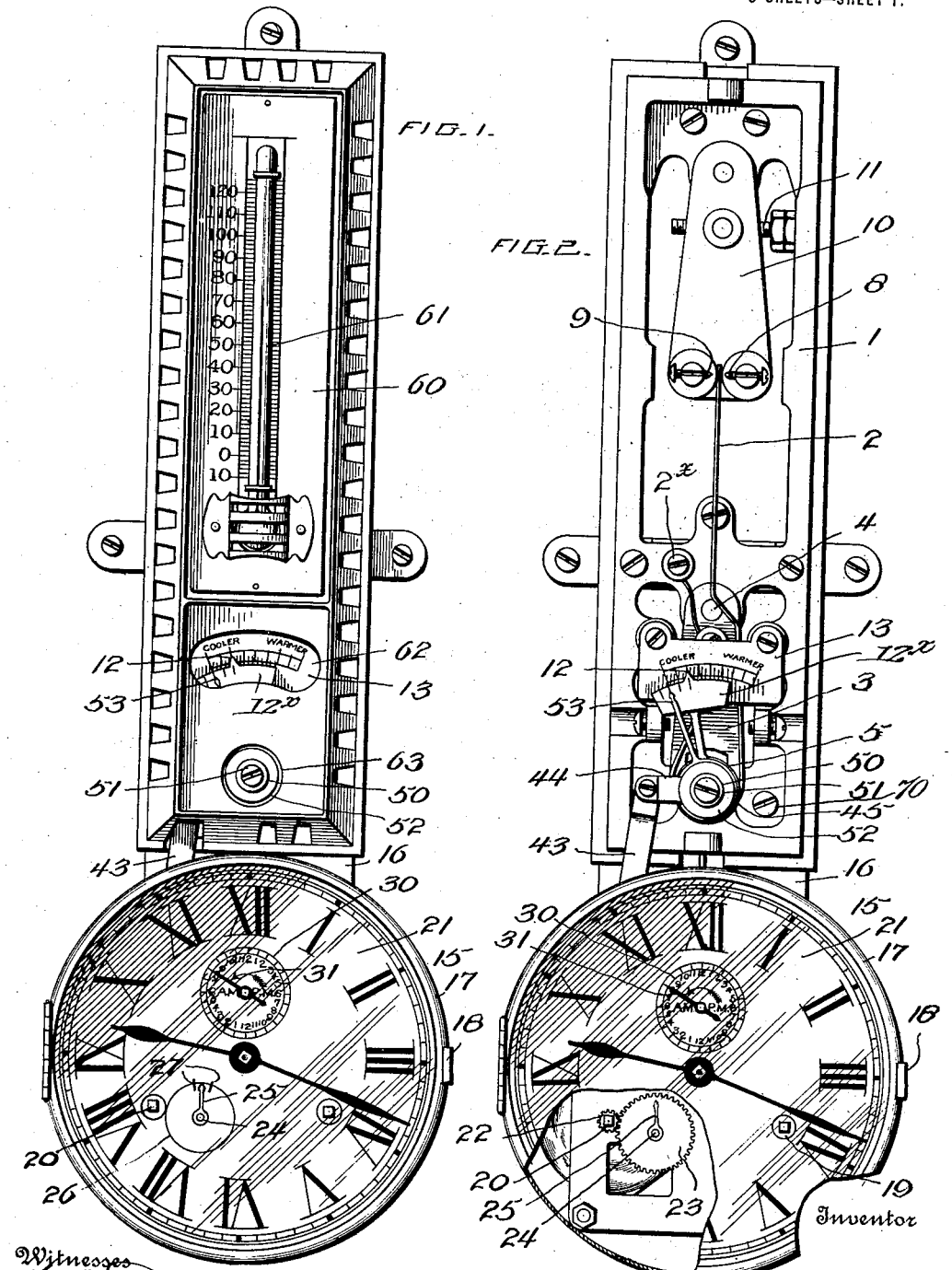

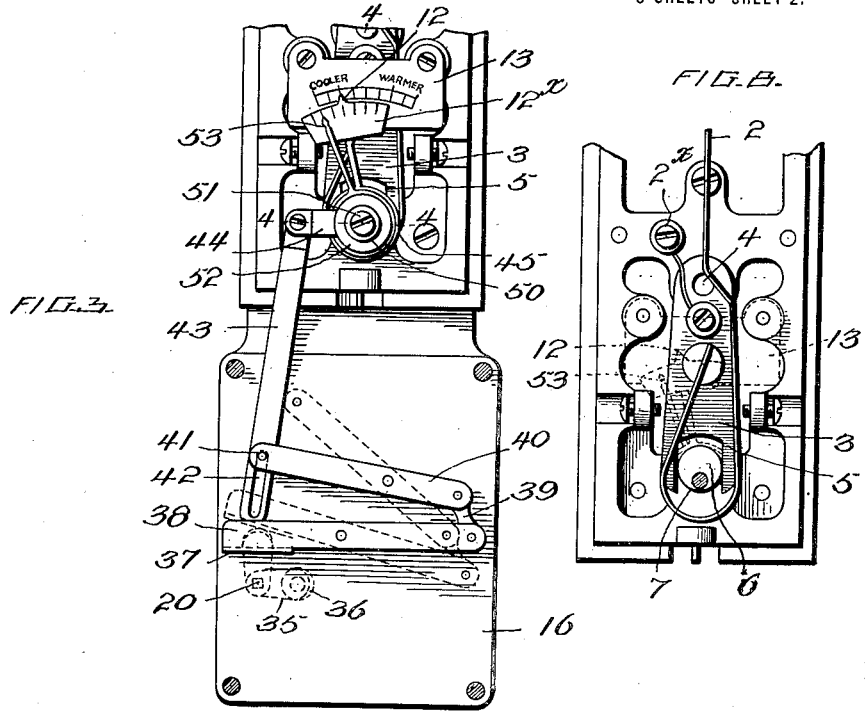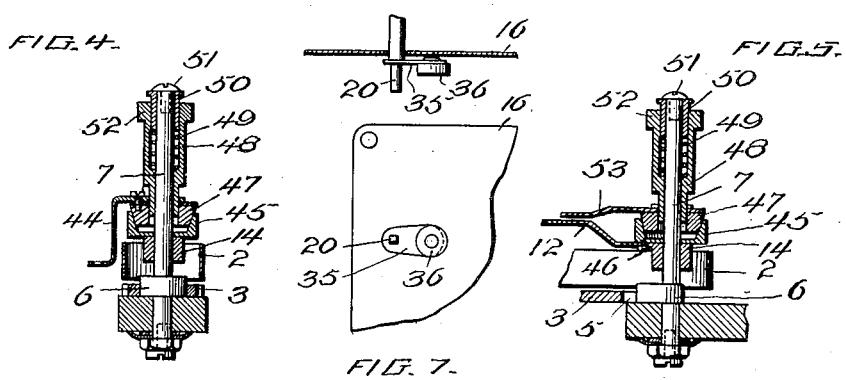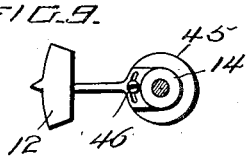

UNITED STATES PATENT OFFICE.

DAVID BELDEN, OF AUBURN, NEW YORK, ASSIGNOR TO JEWELL MANUFACTURING COMPANY, OF AUBURN, NEW YORK, A CORPORATION OF NEW YORK.

THERMOSTAT.

1,154,361.  Specification of Letters Patent.  Patented Sept. 21, 1915.

Application filed March 28, 1914. Serial No. 828,048.

*To all whom it may concern:*

Be it known that I, DAVID BELDEN, a citizen of the United States, residing at Auburn, in the county of Cayuga and State of New York, have invented certain new and useful Improvements in Thermostats; and I do hereby declare the following to be a full, clear, and exact description of the invention, such as will enable others skilled in the art to which it appertains to make and use the same.

My invention relates to that class of thermostats in which a clock mechanism is employed for the purpose of changing the adjustment of the thermostatic element at a predetermined time. This device is employed frequently in connection with damper controlling mechanism operatively connected with a heating plant or furnace for heating dwellings and other buildings, or with controlling mechanism for valves for heating or cooling systems or in other connections, the movement of the thermostatic element under changes of temperature in the room or other place where the thermostat is situated being caused to control electric circuits by means of which such damper or valve controlling mechanisms are brought into operation, the thermostatic element being adjustable so as to effect the change in its electrical circuits at different degrees of temperature and the clock mechanism being employed to effect desired adjustments of the thermostatic element at predetermined times.

My invention consists in the novel feature hereinafter described reference being had to the accompanying drawings which show one embodiment of my invention and a slight modification thereof selected by me for purposes of illustration and the said invention is fully disclosed in the following description and claims.

Referring to said drawings, Figure 1 represents a front elevation of a thermostat with clock attachment embodying my invention and selected by me for the purpose of illustrating same. Fig. 2 is a similar elevation with the casing or screen of the thermostat removed and a portion of the clock broken away to show parts beneath. Fig. 3 is a partial elevation of the lower portion of the thermostat with the screen or casing removed and the clock mechanism removed and showing the connections between the clock controlled actuating means and the adjusting mechanism for the thermostatic element. Fig. 4 is a detailed sectional view on line 4—4 of Fig. 3, of the thumb piece of the thermostat, the adjusting mechanism for the thermostatic element and the parts connected therewith. Fig. 5 is a similar section through the same parts taken on a plane perpendicular to the plane on which Fig. 4 is taken. Figs. 6 and 7 are details showing the clock controlled actuating device for moving the adjusting mechanism for the thermostatic element. Fig. 8 is a detailed view illustrating the means for supporting and adjusting the thermostatic element. Fig. 9 is a detailed bottom plan view of the pointer and the clutch member connected therewith, the adjusting shaft being shown in section. Fig. 10 is a view similar to Fig. 2 showing a slight modification of my invention. Fig. 11 is a partial rear view of the thermostat shown in Fig. 10. Fig. 12 is a detailed sectional view on the line 12—12 of Fig. 10. Fig. 13 is a detailed sectional view showing the devices for connecting the upper end of the clock case to the thermostat body.

The object of my present invention is to provide the thermostat with a clock mechanism so constructed and combined therewith that it will adjust the thermostatic element at a predetermined time and to a predetermined degree, while leaving the adjusting mechanism for the thermostatic element at all times except during the momentary operation of the clock controlled actuating mechanism, entirely free, so that it may be readily adjusted by hand without interference from the clock controlled actuating mechanism.

My invention also has for its object to provide means for varying the extent to which the adjusting mechanism for the thermostatic elements shall be moved by the clock controlled actuating mechanism, which means are located adjacent to the thumb piece by which the hand adjustment of the thermostatic element is secured, and by the manipulation of which the said variation of movement may also be regulated.

My invention also provides a clock mechanism which will operate the said adjusting mechanism on successive days, being preferably provided with an eight-day movement and said clock mechanism is also arranged so that all the winding and setting mechanisms of the device are at the front of the clock mechanism where they are readily accessible, the clock mechanism is also preferably provided with means for indicating when the actuating mechanism for the adjusting mechanism for the thermostatic element, is fully wound and indicating at all times the extent to which said actuating mechanism has partially run down so that these facts can always be ascertained from an examination of the face of the clock mechanism with certainty.

In the embodiment of my invention herein shown in Figs. 1 to 9 inclusive, which has been selected by me for the purpose of illustrating the invention, 1 represents the main frame of the thermostat proper and 2 represents the thermostatic element which is in this instance secured to a plate 3 pivoted at 4 to the frame of the thermostat and is provided at the opposite end with a bifurcated portion 5 which engages an adjusting cam 6 mounted upon an adjusting shaft 7 and rigidly secured thereto, so that a turn of said shaft and cam will move the plate 3 laterally to change the position of the thermostatic element. The free end of the thermostatic element 2, lies between contacts 8 and 9 suitably secured to the thermostatic frame, being in this instance mounted upon an adjustable plate 10 pivoted to the thermostat frame and held in its adjusted position by means of an adjusting screw 11 as set forth in my former Patent #1,048,277, dated December 24, 1912.

The adjusting shaft 7 above referred to is provided with a pointer 12 rigidly secured thereto and traversing a suitable scale 13 secured to the thermostat frame, the pointer in this instance being connected to a collar 14 secured to the adjusting shaft 7.

15 represents the clock which is preferably provided with an eight-day movement secured to the thermostat frame. In this instance the thermostat frame is provided with a downwardly extending plate 18 to which the clock is secured in any desired manner. The clock is preferably provided with a hinged frame 17 carrying a glass cover plate, the said frame being normally held in closed position by a spring catch 18 and capable of being swung outwardly to permit the winding or setting of the clock. The time mechanism is provided with a suitable winding stem 19 and the clock is also provided with spring actuating clock controlled mechanism corresponding with the usual alarm mechanism of an ordinary eight-day clock which is wound by means of a stem 20. Both of these stems extend through the dial 21 of the clock so that they may be wound from the front without disturbing the relation of the clock with the thermostat frame 1 or other connected mechanism. I prefer to provide the stem 20 which for convenience I designate "alarm wind stem" with a pinion 22 engaging a gear wheel 23 on a shaft 24 which extends through the dial of the clock and is provided with a pointer or small hand 25 arranged to traverse a small indicating dial or circle 26 on the clock dial which small dial or circle is provided with suitable indications to designate the position of the hand when the thermostat actuating mechanism is fully wound. This consists in this instance of two marks indicated at 27, Fig. 1, between which the hand 25 will lie when the actuating mechanism is fully wound, the relative number of the teeth in the pinion 22 and gear wheel 23 being such that the hand 25 and said gear wheel 23 will be given one complete revolution in winding the actuating mechanism. Obviously the travel of the hand 25 around the circle or dial 26 will at all times indicate to what extent the actuating mechanism has run down and said small dial or circle may be provided with further indications to correspond with the number of days for which the mechanism may be operative, if desired. The clock dial is also provided with a small circle or dial 30 having indications corresponding to the twenty four hours of a day and preferably divided numerically into two sections marked one to twelve respectively, one side of the dial being marked A. M. and the other side P. M. as shown, and the clock mechanism is provided with suitable means similar to those employed in an ordinary eight-day alarm clock for releasing the alarm wind spring and securing one revolution of the alarm wind stem 20 at any desired time in the twenty four hours which mechanism is not herein specifically shown and will not be particularly described, as said mechanism in itself does not constitute a part of my present invention. Said setting mechanism is provided with a hand or pointer 31 traversing the small setting dial 30 to enable the actuating mechanism to be so set as to be released at any desired hour or fraction of an hour in the twenty four. The setting mechanism is also operated from the face of the clock by means of a suitable key which may be made to engage the shaft which carries the hand or pointer 31 in a well known way. The clock is also preferably provided with the usual hour and minute hands as shown in the drawings so that it may serve as a time piece.

The alarm wind stem 20 is provided at its rear end as shown in Figs. 3, 6, and 7, with an actuating arm 35, preferably provided with a friction roller 36 to engage a lip or flange 37 on a lever 38 pivoted to the plate 16 and operatively connected with the adjusting shaft 7 for operating the adjusting cam 6 and shifting the position of the thermostatic element. In the present instance, the lever 38 is connected to one end by link 39 to a lever 40 also pivoted to the plate 16 and having at its opposite end a pin 41 engaging a slot 42 in a push rod 43 the upper end of which is operatively connected to a short actuating arm 44 which is in turn operatively connected with the adjusting shaft 7. In order that the actuating mechanism of the clock may throw the pointer of the thermostat to different positions and thereby impart different degrees of movement to the adjusting mechanism for the thermostatic element, I prefer to provide a clutch mechanism between the actuating arm 44 and the adjusting shaft 7. In the present instance I have shown the shaft 7 provided with a cone clutch the female member 45 of which is rigidly secured to the shaft 7, being in this instance slipped over the shaft and secured to the pointer 12 by means of a screw 46 which engages a concentric slot in the pointer plate to permit of slight adjustment in assembling the parts. 47 refers to the male member of the clutch which is secured to a sleeve 48 movable vertically and loosely engaging the shaft 7, said sleeve being counterbored to receive a spring 49 the lower end of which engages the lower end of the counterbore of said sleeve and the upper end engaging a part connected with the shaft 7, in this instance a collar 50 held in place by screw 51 engaging shaft 7. The sleeve 49 is provided with a thumb piece 52 which is preferably milled or otherwise roughened on its periphery so that it may readily be turned by the thumb and finger. The pointer 12 is preferably provided with a wide plate portion 12$^x$ which is marked with a scale of degrees of heat corresponding with the degrees on the scale 13 and the sleeve 48 is provided with an auxiliary pointer 53 which travels over the pointer scale 12$^x$, as will be seen. The spring 49 normally presses down the sleeve and clutch member 47, holding the latter in firm engagement with the clutch member 45 so that the thumb piece 52, both clutch members and the shaft 7 may be rotated simultaneously to move the cam 6 and adjust the thermostatic element 2, by hand.

The actuating arm 35 of the clock mechanism normally stands in the position indicated in Fig. 7 that is to say out of contact with the flange 37 on lever 38 so that the thumb piece may be turned to the left without interference between the parts connected therewith and the actuating mechanism of the clock. By reason of the slot 42 the thumb piece may also be turned to the right as far as the limits of the instrument permit without interference with the clock actuating mechanism. It will also be seen that when the time indicated by the position of the hand 31 on the setting dial 30 is reached the actuating mechanism of the clock will be released and the alarm wind stem 20 will make one complete revolution, and be stopped by the mechanism of the clock, and in such revolution the friction roller 36 will strike the lip 37 of the lever 38 and move the push rod 43 upwardly, if the pointer 12 has been moved to the left a sufficient distance, thereby pushing upward the short actuating arm 44 and partially rotating the shaft 7 together with the pointers 12 and 53 and moving the pointer 12 to the right to a predetermined position on the scale 13 of the thermostat. If it is desired to move the pointer 12 to a different predetermined position it is necessary to adjust the relative positions of the short actuating arm 44 and the shaft 7 which adjustment is indicated by the position of the auxiliary pointer 53 on the pointer scale 12$^x$. Thus assuming that when the auxiliary pointer 53 is in a position coincident with the pointer 12, the mechanism will cause the pointer 12 to be moved to a central position on the scale 13 which indicates the temperature of 70°, which is the adjustment of the instrument I prefer, if it were desired to throw the pointer 12, by means of the clock actuating mechanism, to, say, 80°, the user would simply pull out the thumb piece 52 and sleeve 48 sufficiently to disengage the clutch members 45 and 47 and move the auxiliary pointer 53 to the second line to the left of the pointer 12 on the pointer scale 12$^x$ (the lines or degree indications on both scales being separated ordinarily 5°), as shown in Fig. 3. If now the clock actuating mechanism is released the friction roller 36 will impart movement to the levers 38 and 40 and the push rod 43 and throw the pointer 12 to a position two indications to the right of the central indications (corresponding with 70°) or in other words to the indication corresponding with 80°. The thumb piece 52 therefore serves the double purpose of effecting the independent hand adjustment of the thermostatic element and also the adjustment of the connections between the clock actuating mechanism and the adjusting mechanism for the thermostatic element to vary the position to which the said adjusting mechanism will be moved when the clock actuating mechanism is brought into operation.

The thermostat will be provided with the usual casing or screen 60 having thereon a thermometer 61 and provided with an aperture 62 through which the scale 13 and pointers 12 and 53 may be seen and an aperture 63 for the thumb piece and also suitable apertures for the admission of air for the thermostatic element in the usual manner.

As an example of the use of the instrument just described let it be supposed that it is installed in a dwelling and that electric connection from contacts 8 and 9 and a contact 2ˣ connected with the thermostatic element are made to a suitable damper controlling mechanism connected with the dampers of the furnace supplying heat to the building. The thermostat can be set by means of the thumb piece 52 so that the thermostatic element will make contact with one or the other of the contacts 8 and 9 when the temperature rises above, or falls below any desired degree. Where it is desired to maintain a lower temperature during the night and a higher temperature during the day the mechanism may be set by adjusting the auxiliary pointer 53 with respect to the pointer 12 to secure the desired day temperature and the clock mechanism may be set by means of the shaft of the hand 31 to operate at a desired hour say 6 o'clock a. m. The user will before retiring turn the thumb piece of the thermostat to the left to set the instrument so as to maintain the desired low temperature during the night and the clock mechanism will be actuated at the hour for which it is set on the following morning and will throw the pointer 12 up to the desired predetermined degree and adjust the thermostat automatically for the day temperature. Obviously the clock actuating mechanism will perform this service each morning during the operation of the clock mechanism without further attention it being only necessary to turn the pointer to the left to set the instrument to maintain a low or night temperature, each night. It will also be seen that at all times the hand adjustment of the device may be effected by turning the thumb piece in either direction without interference with the clock controlled actuating mechanism.

In the foregoing description I have referred to the adjusting mechanism for varying the position of the thermostatic element. I wish it to be understood that my invention is equally applicable to that class of thermostats in which the thermostatic element is stationarily mounted and the adjustment of the thermostat to cause it to operate at different temperatures is effected by moving the contacts corresponding with contacts 8 and 9 with respect to the said thermostatic element. I have therefore referred to the adjusting mechanism broadly in the following claims, as adjusting mechanism for varying the operation of the thermostatic element.

In Figs. 10 to 12 inclusive a slightly different modification of my invention is shown, in which 1ª represents the body of the thermostat, 2ª the thermostatic element, which, in this instance, is rigidly connected at one end to the body 1ª and has its movable portion, or blade, arranged between two contacts carried on a plate 3ª pivotally mounted on the body 1ª and provided with a mechanism for adjusting the lower end of the plate laterally, which, in this instance, consists of an eccentric, 6ª, located between arms 5ª forming a bifurcated lower end of the plate 3ª. The cam, 6ª, is fast on a sleeve 7ª and the said sleeve is provided with a pointer, 12ª, traversing a scale 13ª on the thermostat body. A shaft, 48ª, extends through said sleeve 7ª and a clutch mechanism is employed for normally holding the sleeve and shaft united for joint rotary movement. In this instance the sleeve is provided with the male member 47ª and the shaft with the female member 45ª of a friction cone clutch, and the clutch members are held in engagement by a spring 49ª surrounding the shaft and extending from the sleeve 7ª to a thumb piece 52ª by which the shaft can be turned and which is rigidly secured to the shaft. The thumb piece also carries an auxiliary pointer, 53ª, which traverses the same scale as the main pointer 12ª. The shaft 48ª is connected by an arm 44ª with a push rod 43ª secured to the back plate 16ᶜ of the device by means of a screw 41ª engaging a slot 42ª in the push rod and said push rod is provided with a lip or flange 37ª adapted to be engaged by an eccentric or oval device 35ª mounted on the shaft 20ª of the alarm wind mechanism for effecting the adjustment of the thermostatic contacts automatically through the clock mechanism at any predetermined time for which the clock mechanism is set. The construction of the parts is such that the eccentric device will always throw the pointer 53ª to a predetermined point on the scale, as, for example, 70 represented by the central indication thereon, although the particular point may be varied by changing the relation of the arm 44ª to the shaft 48ª. If the thermostat is to be set by the clock at such predetermined point as 70, the main pointer 12ª and the auxiliary pointer 53ª are made to coincide. If it is desired to adjust the thermostat to a higher temperature than that for which the auxiliary pointer is adjusted, the operator will turn the main pointer 12ª by means of the thumb piece to the desired higher temperature, as say 80, and then push in the thumb piece so as to release the clutch members 45ª and 47ª and turn the auxiliary pointer back to its predetermined point on the scale as 70. Conversely, if the desired day temperature is below 70, the proper adjustment of the mechanism to produce that result of clock actuation can be accomplished by setting the main pointer 12ª to the lower temperature desired, then releasing the clutch and setting the auxiliary pointer 53ª in advance of the main pointer at the predetermined temperature. In this manner the desired adjustment of the day temperature may be accurately determined without the use of an auxiliary scale.

In Figs. 10 to 12 the clock case is shown as rectangular, and it is preferably detachably connected to the thermostat frame so that it can be removed for adjustment or repair if necessary, without disturbing the thermostat. In this instance, the clock body 17$^a$ is provided with studs 16$^a$ at its upper end, having hook portions 16$^b$ which detachably engage suitable apertures in the bottom of the thermostat body 1$^a$ as shown in Fig. 13. A back plate 16$^c$ is secured to the thermostat body by means of screws 16$^d$ extending through the front of the thermostat, said plate extending below the thermostat body and preferably having a lip 16$^e$ extending forwardly at the lower end to receive and assist in supporting the clock case when the hooks 16$^b$ have been placed in engagement with the thermostat body as before described. A retaining screw 16$^f$ is preferably passed through the lip 16$^e$ and into the clock case, as shown in Fig. 11, so that the clock is rigidly but detachably secured to the thermostat body. When it is desired to remove the clock, it is only necessary to remove the screw 16$^f$, when, by moving the lower end of the clock case outward, the hooks 16$^b$ may be disengaged from the thermostat body. It will be understood that the push rod 43$^a$ is secured by its screw 41$^a$ to the back plate 16$^c$, as before stated, in proper relation to the eccentric device 35$^a$, and the clock can therefore be removed and replaced without effecting the relations of these parts. The thermostat body is provided with suitable lugs 50$^a$ for enabling the thermostat to be attached to the wall or other support upon which it is mounted.

The clock is provided with a hinged frame 17$^b$ at the front, giving access to the winding and setting devices for the time movement and the thermostat actuating movement, all of which are accessible from the front without disturbing the fixed relation of the clock and thermostat.

What I claim and desire to secure by Letters Patent is:

1. The combination with a thermostat having an adjusting mechanism for varying the operation of the thermostatic element, of a clock mechanism provided with a time mechanism and an actuating mechanism controlled thereby constructed to effect a plurality of similar operations of the adjusting mechanism, at intervals, winding mechanism for the time mechanism, separate winding mechanism for the said actuating mechanism, indicating mechanism operatively connected with the winding mechanism for said actuating mechanism, for indicating the number of operations of the adjusting mechanism thereby, and operative connections between the said actuating mechanism and said adjusting mechanism.

2. The combination with a thermostat provided with an adjusting mechanism for varying the operation of the thermostatic element, and a hand operated device for actuating said adjusting mechanism, of a clock mechanism operatively connected with said thermostat and provided with a time movement, and an actuating mechanism controlled thereby operative connections between said actuating mechanism and the adjusting mechanism for the thermostatic element and adjusting mechanism for varying the extent of movement of the adjusting mechanism for the thermostatic element, operatively connected with said hand operated device.

3. The combination with a thermostat provided with an adjusting mechanism for varying the operation of the thermostatic element, and a hand operated device connected with said adjusting mechanism, of a clock mechanism secured to the thermostat and provided with a time mechanism and an actuating mechanism controlled thereby, operative connections between said actuating mechanism and the adjusting mechanism for the thermostatic element, including relatively movable parts, means for normally holding said relatively movable parts in fixed relation and a connection between the hand operated device and one of the said parts for temporarily separating and adjusting the said relatively movable parts.

4. The combination with a thermostat provided with an adjusting mechanism for varying the operation of the thermostatic element, and a hand operated device connected with said adjusting mechanism, of a clock mechanism secured to the thermostat and provided with a time mechanism and an actuating mechanism controlled thereby, operative connections between said actuating mechanism and the adjusting mechanism for the thermostatic element, including relatively movable parts, and clutch members for connecting the same, means for holding said clutch members normally in engagement and a connection between one of said clutch members and said hand operated device for separating said clutch members and adjusting said relatively movable parts.

5. The combination with a thermostat provided with an adjusting mechanism for varying the operation of the thermostatic element, and a hand operated device connected with said adjusting mechanism, of a clock mechanism secured to the thermostat and provided with a time mechanism and an actuating mechanism controlled thereby, operative connections between said actuating mechanism and the adjusting mechanism for the thermostatic element, including relatively movable parts and friction clutch members for connecting said parts, a spring normally holding said clutch members in engagement with each other, said hand operated device being connected with one of said clutch members for disengaging said clutch members and adjusting said relatively movable parts.

6. The combination with a thermostat provided with an adjusting mechanism for varying the action of the thermostatic element, a hand operated device connected with said adjusting mechanism, a clock mechanism connected with the thermostat and provided with a time mechanism, and an actuating mechanism controlled thereby, operative connections between said actuating mechanism and said adjusting mechanism including relatively movable parts, said relatively movable parts being provided each with an indicating device, means for holding said parts in fixed relation and a connection between said hand operated device and one of the said parts for temporarily disconnecting and adjusting said relatively movable parts with respect to each other.

7. The combination with a thermostat provided with an adjusting mechanism for varying the operation of the thermostatic element, a hand operated device connected with said adjusting mechanism, a pointer connected with said adjusting mechanism, and a scale on the thermostat coöperating with said pointer, of a clock mechanism connected with the thermostat and provided with a time mechanism and an actuating mechanism controlled thereby, operative connections between said actuating mechanism and the said adjusting mechanism including relatively movable parts, one of said parts being connected with the aforesaid pointer and the other of said parts being provided with an auxiliary pointer coöperating with the first mentioned pointer, means for holding said parts in fixed relation and means for connecting one of the said parts with said hand operated device for temporarily separating and adjusting said relatively movable parts.

8. The combination with a thermostat provided with adjusting mechanism for varying the operation of the thermostatic element, a hand operated device connected with said adjusting mechanism, a pointer connected with said adjusting mechanism and a scale on the thermostat coöperating with said pointer, of a clock mechanism connected with the thermostat and provided with a time mechanism and an actuating mechanism controlled thereby, operative connections between said actuating mechanism and said adjusting mechanism including relatively movable parts one of said parts having a fixed relation with said pointer, and the other of said parts being provided with an auxiliary pointer, means for holding said relatively movable parts in fixed relation and connections between the said hand operated device and the one of said parts provided with the auxiliary pointer for temporarily disconnecting the same and adjusting them with respect to each other.

9. The combination with a thermostat provided with adjusting mechanism for varying the operation of the thermostatic element, a pointer operatively connected with said adjusting mechanism and a hand operated device connected with said adjusting mechanism of a clock mechanism connected with the thermostat and provided with a time mechanism and an actuating mechanism controlled thereby, connections between said actuating mechanism and said adjusting mechanism permitting the free operation of said adjusting mechanism by the hand operated device at all times, said connections including relatively movable parts, means for holding said parts normally in fixed relation, said parts being provided each with a pointer, a single scale coöperating with said pointers, and connections between one of said parts and the hand operated device for temporarily separating said parts and adjusting them with respect to each other.

10. The combination with a thermostat provided with adjusting mechanism for varying the operation of the thermostatic element, a sleeve connected with said adjusting mechanism, a pointer connected to said sleeve and a stationary scale for said pointer of a hand operated shaft extending through said sleeve, and longitudinally movable with respect thereto, coacting clutch members for connecting said shaft and sleeve, a spring normally holding said clutch members in operative relation, a clock controlled actuating mechanism and connections between said mechanism and said shaft.

In testimony whereof I affix my signature in the presence of two witnesses.

DAVID BELDEN.

Witnesses:
 BENJ. C. WICKES,
 P. J. MURPHY.